United States Patent
Sakurai

(10) Patent No.: US 10,233,967 B2
(45) Date of Patent: Mar. 19, 2019

(54) HALF THRUST BEARING

(71) Applicant: DAIDO METAL COMPANY LTD., Nagoya (JP)

(72) Inventor: Shinichi Sakurai, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 15/978,345

(22) Filed: May 14, 2018

(65) Prior Publication Data

US 2018/0355910 A1    Dec. 13, 2018

(30) Foreign Application Priority Data

Jun. 12, 2017    (JP) .................................. 2017-115159

(51) Int. Cl.
*F16C 9/02*    (2006.01)
*F16C 17/04*    (2006.01)
*F02F 7/00*    (2006.01)

(52) U.S. Cl.
CPC .......... *F16C 17/047* (2013.01); *F02F 7/0053* (2013.01); *F16C 9/02* (2013.01); *F16C 2300/22* (2013.01); *F16C 2360/22* (2013.01)

(58) Field of Classification Search
CPC ...... F16C 9/02; F16C 2360/22; F16C 17/047; F02F 7/0053
See application file for complete search history.

(56) References Cited

U.S. PATENT DOCUMENTS

| | | | | |
|---|---|---|---|---|
| 6,149,310 A | * | 11/2000 | Ono | F02F 7/0053 384/294 |
| 7,354,199 B2 | * | 4/2008 | Welch | F16C 9/00 384/275 |
| 9,797,435 B2 | * | 10/2017 | Tanaka | F16C 9/02 |
| 10,006,490 B2 | * | 6/2018 | Tanaka | F16C 33/046 |

(Continued)

FOREIGN PATENT DOCUMENTS

| | | |
|---|---|---|
| JP | H11-201145 A | 7/1999 |
| JP | 2013-019517 A | 1/2013 |
| JP | 2013-238277 A | 11/2013 |

OTHER PUBLICATIONS

Extended European Search Report issued in corresponding EP Application No. 18173233.0, dated Nov. 21, 2018, 6 pages.

*Primary Examiner* — Thomas R Hannon
(74) *Attorney, Agent, or Firm* — Snyder, Clark, Lesch & Chung, LLP

(57) ABSTRACT

A half thrust bearing having a semi-annular shape includes a sliding surface for receiving an axial force of a crankshaft of an internal combustion engine, and a rear surface on an opposite side of the sliding surface, and defines a reference plane on the rear surface side that is perpendicular to an axial direction. The sliding surface includes a flat surface portion near a circumferentially central portion and in parallel with the reference plane, and inclined surface portions on both sides of the flat surface portion in a circumferential direction. At any radial positions of the half thrust bearing, an axial distance between the reference plane and the sliding surface is maximum at the flat surface portion, and is reduced in the inclined surface portions toward both circumferential end portions of the half thrust bearing.

6 Claims, 11 Drawing Sheets

(56) References Cited

U.S. PATENT DOCUMENTS

2011/0200281 A1\* 8/2011 Uehara ................ F16C 43/02
　　　　　　　　　　　　　　　　　　　　　　　　384/428
2016/0032961 A1　　2/2016 Tanaka et al.
2016/0169277 A1　　6/2016 Tanaka et al.

\* cited by examiner

HALF THRUST BEARING

BACKGROUND OF THE INVENTION (1) Field of the Invention

The present invention relates to a thrust bearing which receives an axial force of a crankshaft of an internal combustion engine.

(2) Description of Related Art

A crankshaft of an internal combustion engine is rotatably supported, at its journal portion, in a lower part of a cylinder block of the internal combustion engine via a main bearing which is configured by combining a pair of half bearings into a cylindrical shape.

One or both of the pair of half bearings is used in combination with a half thrust bearing which receives an axial force of the crankshaft. The half thrust bearing is provided at one or both of axial end surfaces of the half bearing.

The half thrust bearing receives an axial force generated in the crankshaft. That is, the half thrust bearing is provided for the purpose of bearing the axial force inputted to the crankshaft when the crankshaft is connected to a transmission via a clutch, for example.

On a sliding surface side of the half thrust bearing near both circumferential ends thereof, thrust reliefs are formed so that a bearing member becomes thinner toward the respective circumferential end surfaces. In general, the thrust relief is formed so that a length from the circumferential end surface to the sliding surface of the half thrust bearing, and a depth at the circumferential end surface are constant irrespective of the position in a radial direction. The thrust relief is formed in order to absorb misalignment of the end surfaces of a pair of half thrust bearings when the half thrust bearings are mounted on a split type bearing housing (see FIG. 10 of JP H11-201145 A).

Further, conventionally, there is also proposed a technique in which, in consideration of the deflection deformation of a crankshaft during operation of an internal combustion engine, a crowning surface having a curved surface shape is provided on at least an outer diameter side of a sliding surface of the half thrust bearing, thereby reducing the local contact stress between the sliding surface of the half thrust bearing and the crankshaft (JP 2013-019517 A).

In addition, there is also proposed a technique in which an inclined surface (thrust relief) which extends from a circumferential end portion of the half thrust bearing by a length of an approximate half of the height of a top portion (outer diameter end at a circumferential center of the half thrust bearing) is formed on a sliding surface of the half thrust bearing, thereby reducing an inclined angle of the inclined surface relative to the sliding surface (see JP 2013-238277 A).

BRIEF SUMMARY OF THE INVENTION

In recent years, crankshafts have been reduced in diameter for reducing the weights of internal combustion engines, so that the rigidity of the crankshaft becomes lower than that of the conventional crankshaft. Accordingly, the deflection of the crankshaft tends to be easily generated during operation of the internal combustion engine, and the vibration of the crankshaft tends to become large. Accordingly, a thrust collar surface of the crankshaft slidingly comes into contact with the sliding surface of the half thrust bearing while being inclined thereto, and the inclined direction thereof changes in accordance with rotation of the crankshaft. As a result, the sliding surface near both circumferential end portions of the half thrust bearing comes into direct contact with the thrust collar surface of the crankshaft, and thus damage (seizure) becomes easily caused.

Further, when a pair of half thrust bearings are assembled to respective end portions in the axial direction of a main bearing constituted by a pair of half bearings, if positions of end surfaces of the pair of half thrust bearings is misaligned when being assembled into a split type bearing housing, a clearance (or gap) between a sliding surface of one of the half thrust bearings and the thrust collar surface of the crankshaft becomes larger than a clearance between the other half thrust bearing and the thrust collar surface of the crankshaft. Alternatively, when only one half thrust bearing is assembled to respective end portions in the axial direction of the main bearing, a large clearance is formed between a side surface of the split type bearing housing on which the half thrust bearing is not provided and the thrust collar surface of the crankshaft. If the internal combustion engine is operated and the deflection of the crankshaft is generated in a state where such a clearance is formed, the thrust collar surface of the crankshaft is further inclined toward the formed clearance side.

If the crankshaft rotates in such a state of being largely inclined toward the clearance side, an inclination of the thrust collar surface relative to the sliding surface of the half thrust bearing in a plane containing both circumferential end surfaces of the half thrust bearing becomes larger. In addition, in the plane containing the both circumferential end surfaces of the half thrust bearing, this inclination of the thrust collar surface repeats an inclined state (a) in which the sliding surface near the circumferential end portion of the half thrust bearing that is located on a backward side in the rotation direction of the crankshaft comes into contact with the thrust collar surface while the sliding surface near the circumferential end portion located on a forward side in the rotation direction of the crankshaft is apart from the thrust collar surface, and an inclined state (b) in which the sliding surface near the circumferential end portion of the half thrust bearing on the forward side in the rotation direction of the crankshaft comes into contact with the thrust collar surface while the sliding surface near the circumferential end portion on the backward side in the rotation direction of the crankshaft is apart from the thrust collar surface, in accordance with the rotation of the crankshaft. Since only the sliding surface near both circumferential end portions of the half thrust bearing comes into direct contact with the thrust collar surface of the crankshaft, damage (seizure) easily occurs there.

Furthermore, when the crankshaft rotates at a high speed, vibration of the crankshaft in the axial direction becomes large, and a circumferentially central portion of the sliding surface of the half thrust bearing comes into contact with the thrust collar surface in the course of shifting the inclination of the thrust collar surface from the inclined state (a) to the inclined state (b), so that friction loss becomes large.

When the inclination of the thrust collar surface toward the clearance side is large due to the deflection of the crankshaft, and thus the inclination of the thrust collar surface in a plane containing both circumferential end surfaces of the half thrust bearing is large, even if the techniques disclosed in JP 2013-019517 A and JP 2013-238277 A are employed, it has been difficult to prevent the sliding surface only near both circumferential end portions of the half thrust bearing from always being in contact with the thrust collar surface of the crankshaft.

Accordingly, an object of the present invention is to provide a half thrust bearing in which the damage (seizure) hardly occurs during operation of the internal combustion engine and the friction loss is small.

In order to achieve the object described above, according to one aspect of the present invention, there is provided a half thrust bearing for receiving an axial force of a crankshaft of an internal combustion engine, the half thrust bearing having a semi-annular shape and including a sliding surface for receiving the axial force, and a rear surface on an opposite side of the sliding surface, and the half thrust bearing defining a reference plane on a rear surface side that is perpendicular to an axial direction, wherein the sliding surface includes a flat surface portion which extends in parallel with the reference plane from a radially inner end of the half thrust bearing to a radially outer end thereof, and inclined surface portions formed on both sides of the flat surface portion in a circumferential direction, an axial distance between the reference plane and the sliding surface is maximum in the flat surface portion, at any radial positions, the axial distance in the inclined surface portions is maximum at circumferential ends of the inclined surface portions on a circumferentially central portion side of the half thrust bearing and is reduced toward both circumferential end portions of the half thrust bearing, at any circumferential positions, the axial distance in the inclined surface portions is constant over a radial direction of the half thrust bearing, or maximum at the radially inner end of the half thrust bearing and is reduced toward the radially outer end, and the flat surface portion has a circumferential length which extends over a circumferential angle of 5° or more and 35° or less, at any radial positions of the half thrust bearing.

The rear surface of the half thrust bearing may be flat, and be positioned in the reference plane.

Further, the flat surface portion may include the circumferentially central portion of the half thrust bearing.

Furthermore, the circumferential length of the flat surface portion may be minimum at the radially inner end of the half thrust bearing and be gradually increased toward the radially outer end thereof, or may be minimum at the radially outer end of the half thrust bearing and be gradually increased toward the radially inner end thereof.

Still further, when the half thrust bearing is seen from a direction perpendicular to both circumferential end surfaces of the half thrust bearing, an outline of each inclined surface portion of the sliding surface may be configured by a curved line.

Still further, a difference between the axial distance in the flat surface portion and the axial distance in both circumferential end portions at the radially outer ends of the half thrust bearing may be 50 to 800 μm.

Here, the crankshaft is a member including a journal portion, a crankpin portion, and a crank arm portion. While the half thrust bearing is a member having a shape obtained by dividing an annular shape into approximately halves, it is not intended to be strictly half.

EFFECT OF INVENTION

According to the half thrust bearing including the configuration described above, even when an inclined angle of the thrust collar surface of the crankshaft relative to the sliding surface of the half thrust bearing becomes large due to the deflection of the crankshaft during the operation of the internal combustion engine, a contact position between the sliding surface and the thrust collar surface is successively moved in the circumferential direction in accordance with the rotation of the crankshaft, so that the sliding surface near both circumferential end portions of the half thrust bearing is prevented from coming into contact with the thrust collar surface of the crankshaft all the time, and damage of the sliding surface of the half thrust bearing hardly occurs.

In addition, the thrust collar surface is prevented from coming into contact with the sliding surface in the circumferentially central portion of the half thrust bearing due to the axial vibration of the crankshaft during the operation of internal combustion engine at high speeds, so that the friction loss becomes small.

DETAILED DESCRIPTION OF THE INVENTION

Hereinafter, embodiments of the present invention will be described with reference to the drawings.

Embodiment 1

(General Configuration of Bearing Device)

Figure 1:
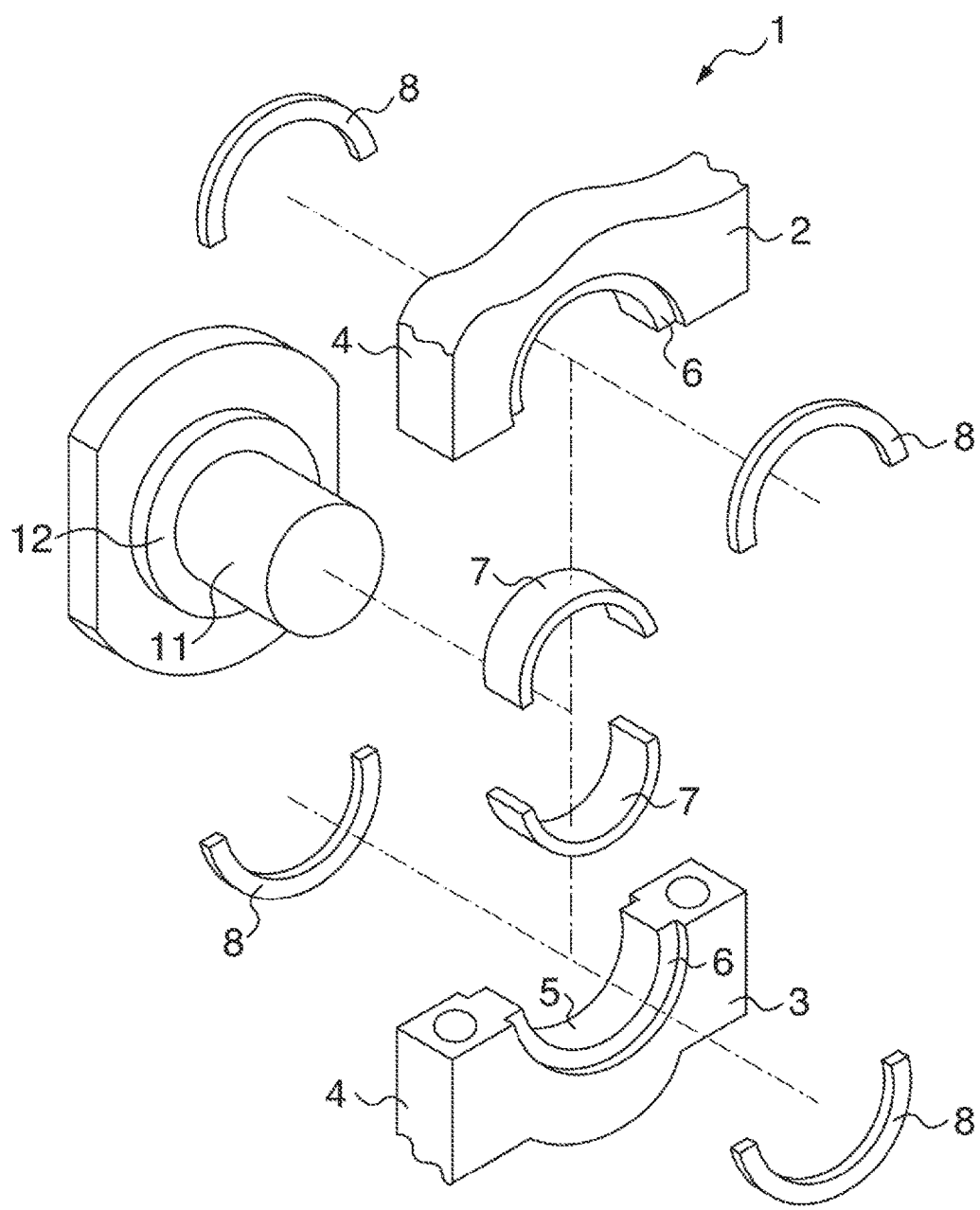
FIG. 1 is an exploded perspective view of a bearing device.
Figure 5:
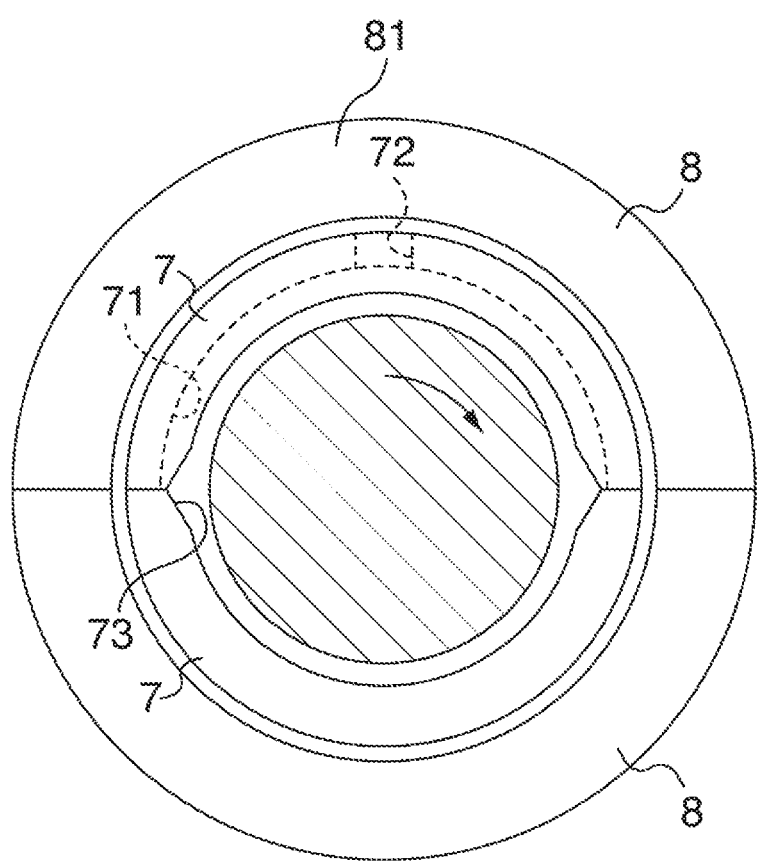
FIG. 5 is a front view of half bearings and a thrust bearing.
Figure 6:
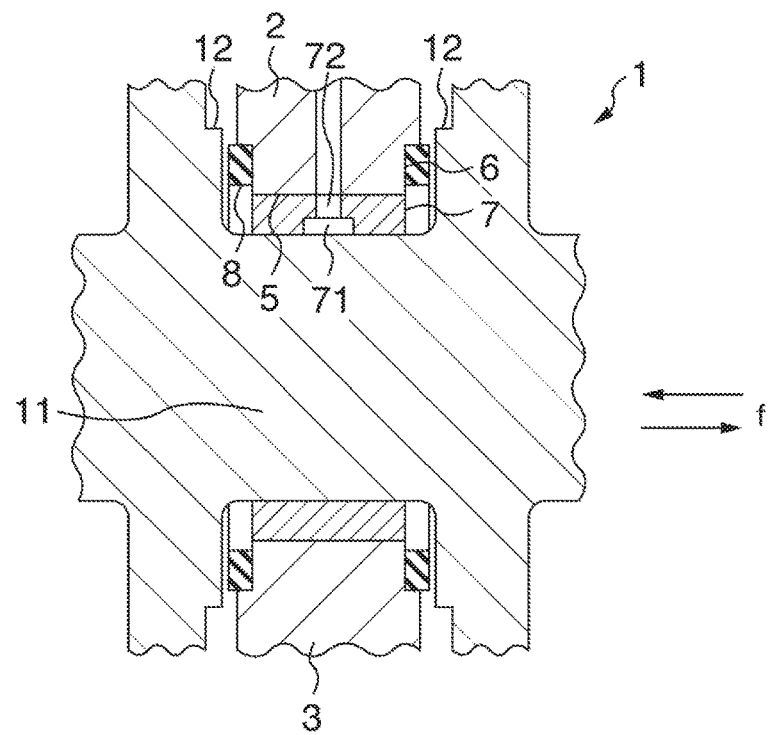
FIG. 6 is a cross-sectional view of the bearing device.

First, a description will be given for a general configuration of a bearing device 1, using FIGS. 1, 5, and 6. As shown in FIGS. 1, 5, and 6, a bearing housing 4 configured by attaching a bearing cap 3 to a lower part of a cylinder block 2 has a bearing hole (holding hole) 5 which is a circular hole penetrating between both side surfaces of the cylinder block 2 and the bearing cap 3. The side surfaces have seats 6 and 6, which are annular recesses, on the periphery of the bearing hole 5. Half bearings 7 and 7 are combined into a cylindrical shape and fitted in the bearing hole 5. The half bearings 7 and 7 rotatably support a journal portion 11 of a crankshaft. Half thrust bearings 8 and 8 are combined into an annular shape and fitted in the seats 6 and 6. The half thrust bearings 8 and 8 receive an axial force f (see FIG. 6) of the crankshaft via a thrust collar surface 12. It is to be noted that FIG. 5 illustrates the half thrust bearings 8 which do not have the configuration of the present invention.

Figure 7:
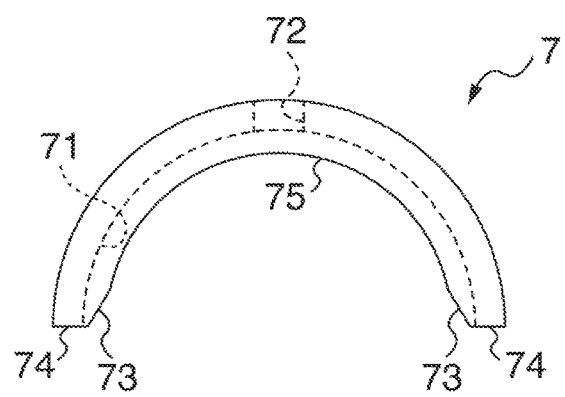
FIG. 7 is a front view of an upper half bearing in FIG. 5.
Figure 8:
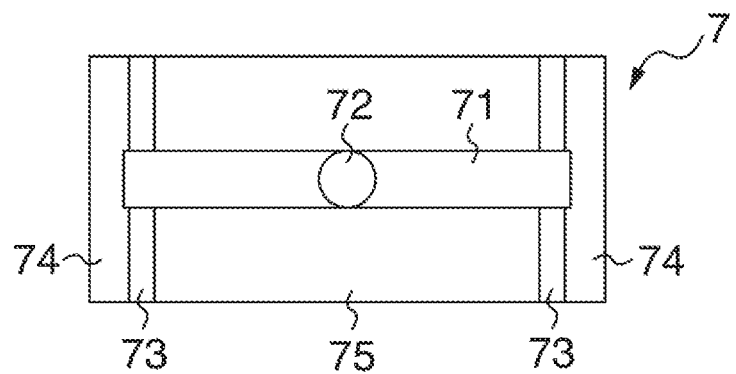
FIG. 8 is a bottom view of the half bearing in FIG. 7 seen from the inner side in the radial direction.

As shown in FIG. 5, a lubrication oil groove 71 is formed on an inner peripheral surface of the (upper) half bearing 7 of the half bearings 7 and 7 constituting a main bearing that is provided on a cylinder block 2 side, and a through hole 72 is formed to penetrate the half bearing 7 from the lubrication oil groove 71 to an outer peripheral surface (also see FIGS. 7 and 8). The lubrication oil groove 71 may be formed on both of the upper and lower half bearings. Further, each half bearing 7 has crush reliefs 73 on a sliding surface 75 adjacent to both circumferential end surfaces 74.

(Configuration of Half Thrust Bearing)

Next, the configuration of the half thrust bearings 8 of embodiment 1 will be described using FIGS. 2 to 4. Each half thrust bearing 8 of the embodiment is a semi-annular shaped flat plate formed from a bimetal which is obtained by bonding a thin bearing alloy layer to a back metal layer made of steel. Each half thrust bearing 8 includes a sliding surface 81 (bearing surface) facing in an axial direction, and the sliding surface 81 is configured by a bearing alloy layer.

Figure 2:
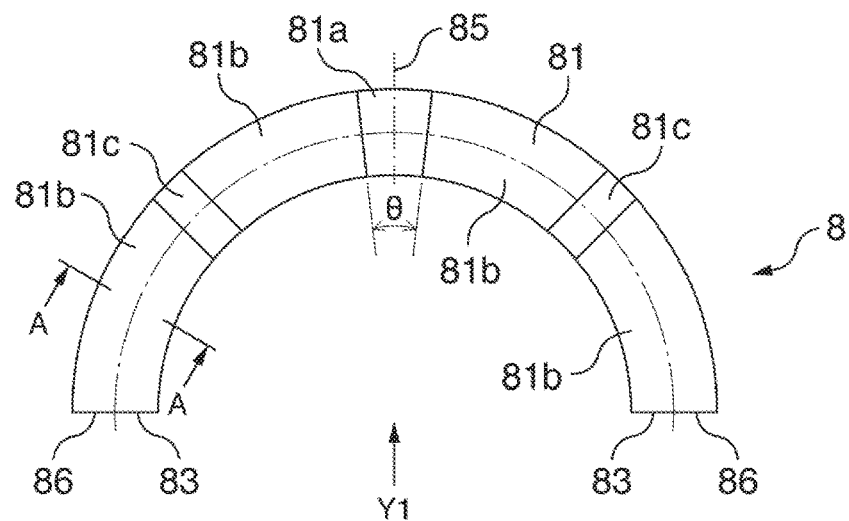
FIG. 2 is a front view of a half thrust bearing of embodiment 1.
Figure 3:
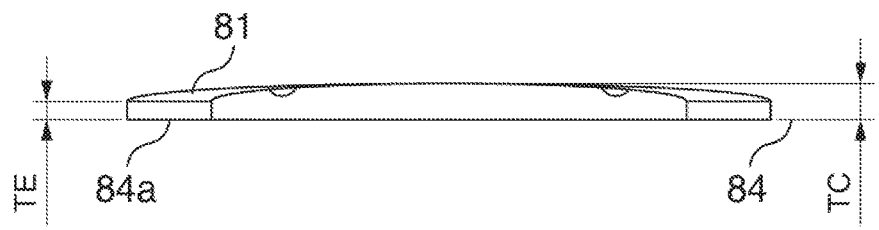
FIG. 3 is a side view of the half thrust bearing in FIG. 2 seen in the direction of arrow Y1.
Figure 4:
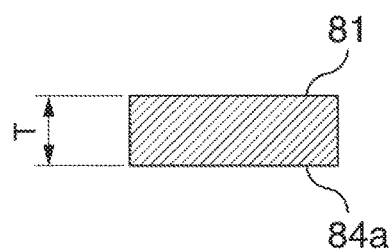
FIG. 4 is a cross-sectional view of the half thrust bearing in FIG. 2 taken along line A-A.

Each half thrust bearing 8 defines a reference plane 84 perpendicular to the axial direction, and includes a rear surface 84a in this reference plane 84 that is adapted to be arranged on the seat 6 of the cylinder block 2 and is a substantially flat shape (see FIG. 3). In addition, each half thrust bearing 8 includes the sliding surface 81 apart from the reference plane 84 (the rear surface 84a) in the axial direction. The sliding surface 81 is adapted to receive the axial force f (see FIG. 6) via the thrust collar surface 12 of the crankshaft. More specifically, the sliding surface 81 includes one flat surface portion 81a which includes a circumferentially central portion 85 of the half thrust bearing 8 and is in parallel with the reference plane 84, and two inclined surface portions 81b which are provided on both sides (opposite sides) of the flat surface portion 81a in the circumferential direction. At any radial positions of the half thrust bearing 8, an axial distance (thickness) from the reference plane 84 to the sliding surface 81 is maximum in the flat surface portion 81a, and is reduced in the inclined surface portions 81b from the sides of the flat surface portion 81a toward both circumferential end portions of the half thrust bearing. Accordingly, it would be understood that also at a radially central position (a circumferential dot-and-dash line in FIG. 2) of the half thrust bearing 8, for example, the axial distance from the reference plane 84 to the sliding surface 81 is maximum (TC) in the flat surface portion 81a, and minimum (TE) at both circumferential end portions 86. It is to be noted that in order to improve retainability of the lubrication oil, each inclined surface portion 81b may include an oil groove 81c extending in the radial direction.

Further, as shown in FIG. 2, the flat surface portion 81a has a front shape which is surrounded by an inner peripheral portion defined by a circular arc at a radially inner end of the half thrust bearing 8, an outer peripheral portion defined by a circular arc at a radially outer end thereof, and two straight lines positioned on both circumferential sides thereof. Each of the inner peripheral portion and the outer peripheral portion has a circumferential length extending over a circumferential angle θ. Each of the inner peripheral portion and the outer peripheral portion is preferably formed so as to have the circumferential length extending over a circumferential angle of 5° to 35°.

In the embodiment, the axial distance between the reference plane 84 (the rear surface 84a) and the sliding surface 81 corresponds to a bearing wall thickness T of the half thrust bearing 8. Specially in the embodiment, the half thrust bearing 8 is formed such that the bearing wall thickness T is constant between an inner diameter side end and an outer diameter side end at any circumferential positions (see FIG. 4). That is, the bearing wall thickness T is maximum and constant (TC) over the radial direction in the flat surface portion 81a, whereas is minimum and constant (TE) over the radial direction at both circumferential end portions.

It is to be noted that in a portion of the inclined surface portion 81b where the oil groove 81c is formed, the half thrust bearing 8 is formed such that an axial direction distance from the rear surface 84a to an imaginary sliding surface (extension surface of the inclined surface portion 81b), which must exist when the oil groove 81c is not formed, satisfies the abovementioned relationship.

The half thrust bearing 8 is formed such that the bearing wall thickness TE at both circumferential end portions of the half thrust bearing 8 is smaller than the bearing wall thickness TC in the flat surface portion 81a as described above (see FIG. 3). Accordingly, seen from a direction perpendicular to a plane containing both circumferential end surfaces of the half thrust bearing 8, the sliding surface 81 of the half thrust bearing 8 has an outline of a convex shape in which the flat surface portion 81*a* is protruded most (see FIG. 3). More specifically, when the half thrust bearings 8 are used for a small-sized crankshaft (including an journal portion having a diameter of about 30 to 100 mm) of an internal combustion engine for a passenger vehicle and the like, a difference between a bearing wall thickness in the flat surface portion 81*a* of the half thrust bearing 8 and a bearing wall thickness at both circumferential end portions thereof is, for example, 50 to 800 μm, and more preferably, is 200 to 400 μm. However, these sizes are merely examples, and the difference in bearing wall thickness is not limited to this size range.

(Operation)

Next, the operation of conventional half thrust bearings 8 will be described using FIGS. 5, 6, and 9.

In general, the half bearings 7 are arranged to be concentric with the half thrust bearings 8, so that a plane containing both circumferential end surfaces 74 of the half bearings 7 constituting the main bearing substantially corresponds to a plane containing both circumferential end surfaces 83 of the half thrust bearing 8.

During operation of an internal combustion engine, deflection (deflection in the axial direction) of a crankshaft is generated particularly in the case of the crankshaft in which the diameter is reduced for reducing the weight of the internal combustion engine so that the rigidity is lower than that of the conventional crankshaft, and therefore the vibration of the crankshaft becomes large. This large vibration periodically generates the axial force f in the crankshaft toward the sliding surface 81 of the half thrust bearing 8. The sliding surface 81 of the half thrust bearing 8 receives this axial force f.

Figure 9:
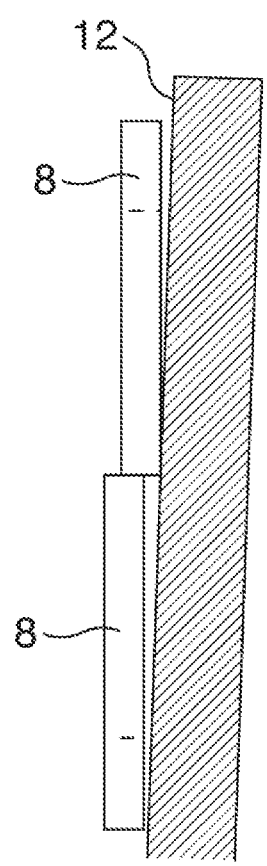
FIG. 9 is a cross-sectional view illustrating a contact state between a thrust collar surface and a pair of half thrust bearings during operation.
Figure 10A:
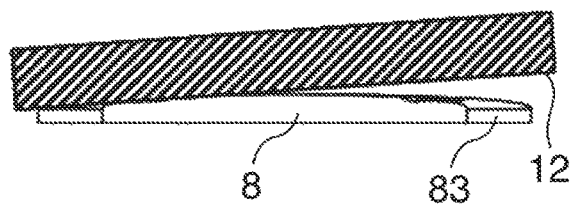
FIG. 10A is a view illustrating an inclination of the thrust collar surface relative to the sliding surface during operation seen from both circumferential end surfaces side.
Figure 10B:
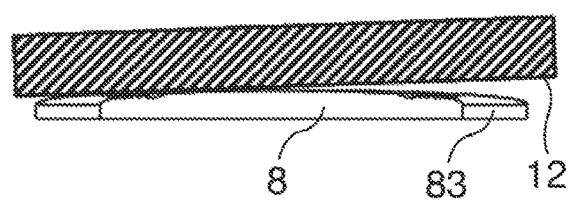
FIG. 10B is a view illustrating an inclination of the thrust collar surface relative to the sliding surface during operation seen from both circumferential end surfaces side.
Figure 10C:
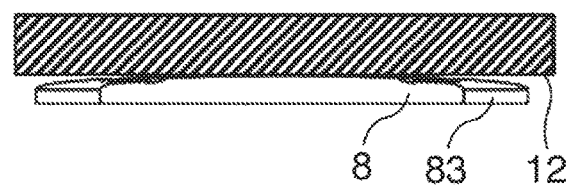
FIG. 10C is a view illustrating an inclination of the thrust collar surface relative to the sliding surface during operation seen from both circumferential end surfaces side.
Figure 10D:
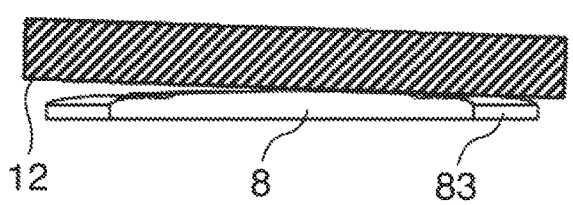
FIG. 10D is a view illustrating an inclination of the thrust collar surface relative to the sliding surface during operation seen from both circumferential end surfaces side.
Figure 10E:
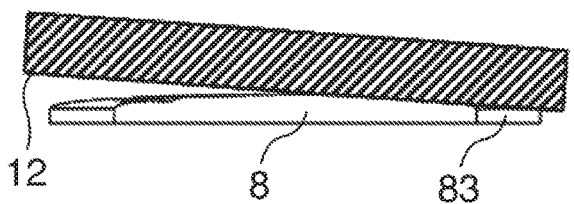
FIG. 10E is a view illustrating an inclination of the thrust collar surface relative to the sliding surface during operation seen from both circumferential end surfaces side.
Figure 11A:
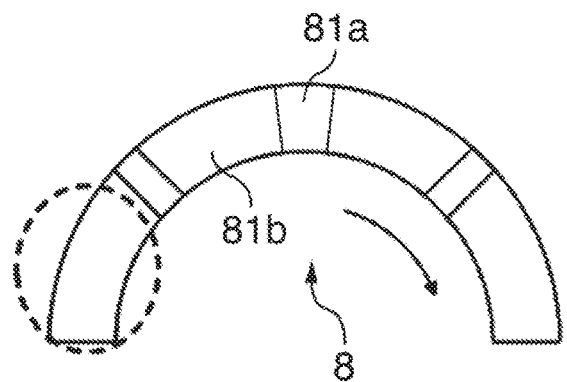
FIG. 11A is a view corresponding to FIG. 10A and illustrating a contact position between the sliding surface and the thrust collar surface when the sliding surface is seen from the front side.
Figure 11B:
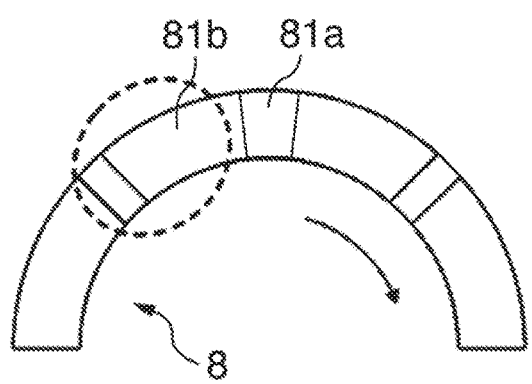
FIG. 11B is a view corresponding to FIG. 10B and illustrating a contact position between the sliding surface and the thrust collar surface when the sliding surface is seen from the front side.
Figure 11C:
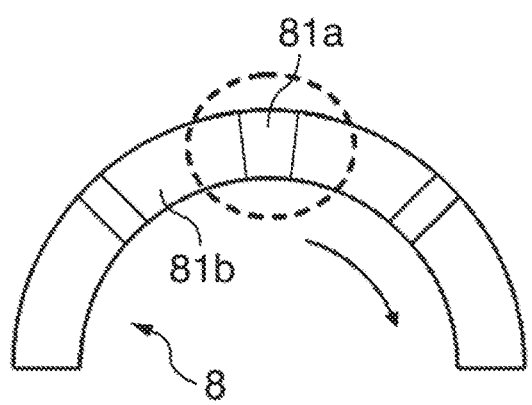
FIG. 11C is a view corresponding to FIG. 10C and illustrating a contact position between the sliding surface and the thrust collar surface when the sliding surface is seen from the front side.
Figure 11D:
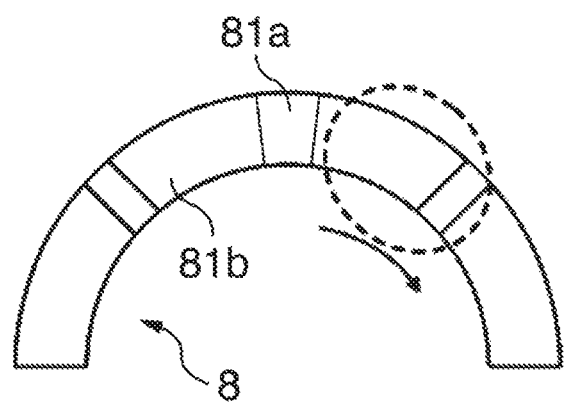
FIG. 11D is a view corresponding to FIG. 10D and illustrating a contact position between the sliding surface and the thrust collar surface when the sliding surface is seen from the front side.
Figure 11E:
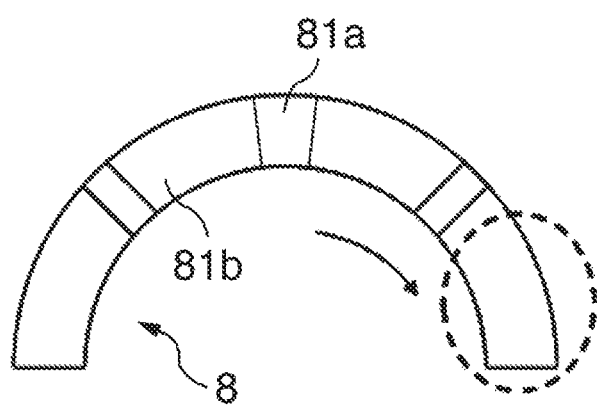
FIG. 11E is a view corresponding to FIG. 10E and illustrating a contact position between the sliding surface and the thrust collar surface when the sliding surface is seen from the front side.

When the pair of half thrust bearings 8 and 8 are attached to respective ends in the axial direction of the main bearing constituted by the pair of half bearings 7 and 7, if positions of end surfaces 83 and 83 of the pair of the half thrust bearings 8 and 8 mounted on the split type bearing housing 4 are not aligned in the axial direction, a clearance (gap) between the sliding surface 81 of one of the half thrust bearings 8 and the thrust collar surface 12 of the crankshaft becomes larger than a clearance between the sliding surface 81 of the other half thrust bearing 8 and the thrust collar surface 12 (see FIG. 9). Alternatively, when only one half thrust bearing 8 is attached to the respective ends in the axial direction of the main bearing, a large clearance is formed between a side surface of the split type bearing housing 4 on which the half thrust bearing 8 is not provided, and the thrust collar surface 12 of the crankshaft. If the internal combustion engine is operated and the deflection of the crankshaft is generated in a state where such a clearance is formed, the thrust collar surface 12 of the crankshaft is further inclined toward the large clearance side. If the crankshaft rotates in such a state of being largely inclined toward the clearance side, conventionally, an inclination of the thrust collar surface 12 relative to the half thrust bearing 8 becomes larger in a plane containing both circumferential end surfaces 83 of the half thrust bearing 8, and only the sliding surface 81 near both circumferential end portions of the half thrust bearing 8 comes into direct contact with the thrust collar surface 12 of the crankshaft all the time, so that damage (seizure) easily occurs as described above.

More specifically, when the half thrust bearing 8 is seen from the direction perpendicular to the plane containing both circumferential end surfaces 83, the thrust collar surface 12 of the crankshaft is in contact with (1) only the sliding surface 81 near the circumferential end portion of the half thrust bearing 8 on the back side of the rotation direction of the crankshaft after the state where the thrust collar surface 12 is inclined toward the circumferential end portion side of the half thrust bearing 8 on the rotation direction backward side of the crankshaft until the thrust collar surface 12 becomes in parallel with the sliding surface 81 of the half thrust bearing 8, and with (2) only the sliding surface 81 near the circumferential end portion of the half thrust bearing 8 on the rotation direction forward side of the crankshaft immediately after the state where the thrust collar surface 12 is in parallel with the sliding surface 81 until the thrust collar surface 12 is inclined toward the circumferential end surface side of the half thrust bearing 8 on the rotation direction forward side of the crankshaft.

Here, as described in JP 2013-19517 A, even when a crowning surface configured by a curved surface is provided on an outer diameter side of a sliding surface of a half thrust bearing, if the half thrust bearing 8 is formed not in such a manner that an axial distance from the reference plane 84 to the sliding surface 81 is maximum near the circumferentially central portion at any radial positions, that is, when the half thrust bearing 8 is seen from a direction perpendicular to a plane containing both circumferential end surfaces 83, if the sliding surface 81 of the half thrust bearing 8 does not have an outline of a convex shape in which the flat surface portion 81*a* is protruded most like the present application, the sliding surface 81 near the circumferential end portion of the half thrust bearing 8 particularly comes into direct contact with the thrust collar surface 12 of the crankshaft for the reason described above, so that damage easily occurs.

Alternatively, as described in JP 2013-238277 A, even if an inclined surface (thrust relief) which extends from a circumferential end portion of a half thrust bearing by a length which is an approximate half of the height of a top portion is formed on a sliding surface of the half thrust bearing, thereby reducing an inclined angle of the inclined surface relative to the sliding surface, in the case that the sliding surface 81 of the half thrust bearing 8 does not have an outline of a convex shape in which the flat surface portion 81*a* is protruded most like the present application, seen from the direction perpendicular to the plane containing both circumferential end surfaces 83 of the half thrust bearing 8, the sliding surface 81 (inclined surface) near the circumferential end portion of the half thrust bearing 8 particularly comes into direct contact with the thrust collar surface 12 of the crankshaft also for the reason described above, so that damage easily occurs.

In addition, in the half thrust bearing described in JP 2013-238277 A, the bearing wall thickness at the inclined surface is larger at a radially outer end of the thrust bearing than that at a radially inner end thereof, except for a circumferential end portion of the half thrust bearing, so that the sliding surface (inclined surface) near the circumferential end portion of the half thrust bearing, particularly at the outer diameter side, comes into direct contact with the thrust collar surface 12 of the crankshaft, and damage more easily occurs.

As described above, when the half thrust bearing 8 is seen from the direction perpendicular to the plane containing both circumferential end surfaces 83, if the sliding surface 81 of the half thrust bearing 8 has an outline which is protruded most only in the circumferentially central portion 85, during the transition period from the state where the thrust collar surface 12 of the crankshaft is inclined toward a circumferential end portion side of the half thrust bearing 8 on the rotation direction backward side of the crankshaft to the state where the thrust collar surface 12 is inclined toward a circumferential end surface side of the half thrust bearing 8 on the rotation direction forward side of the crankshaft, the circumferentially central portion 85 of the sliding surface 81 of the half thrust bearing 8 comes into contact with the thrust collar surface 12 due to the axial vibration of the crankshaft at the moment when the thrust collar surface 12 of the crankshaft becomes in parallel with the sliding surface 81 of the half thrust bearing 8, so that friction loss becomes large.

(Effect)

Next, an effect of the half thrust bearing 8 of this embodiment will be described using FIGS. 10A to 11E.

FIGS. 10A to 10E sequentially illustrate changes of the inclination of the thrust collar surface 12 relative to the sliding surface 81 during operation when the half thrust bearing 8 is seen from the direction perpendicular to the plane containing both circumferential end surfaces 83 of the half thrust bearing 8 (in other words, in a plane containing both circumferential end surfaces 83), and FIGS. 11A to 11E illustrate changes of the contact position of the sliding surface 81 with the thrust collar surface 12 corresponding to FIGS. 10A to 10E when the sliding surface 81 of the half thrust bearing 8 is seen from the front side. A dashed line circle in each of FIGS. 11A to 11E illustrates a contact portion (position on the sliding surface that receives load the most due to the contact) between the sliding surface 81 of the half thrust bearing 8 and the thrust collar surface 12. For example, from FIG. 10B and FIG. 11B corresponding to FIG. 10B, it would be understood that after the contact portion between the sliding surface 81 and the thrust collar surface 12 is apart from the vicinity of the circumferential end portion shown in FIG. 11A, until the thrust collar surface 12 reaches a circumferentially central portion shown in FIG. 11C, the thrust collar surface 12 is still inclined toward the sliding surface 81 in the plane containing both circumferential end surfaces 83.

The half thrust bearing 8 of the embodiment is configured such that the sliding surface 81 includes the flat surface portion 81a in parallel with the reference plane 84 near the circumferentially central portion, and an axial distance T from the rear surface 84a (reference plane 84) to the sliding surface 81 is maximum at the flat surface portion 81a at any radial positions of the half thrust bearing 8, is reduced in the inclined surface portions 81b from the side of the flat surface portion 81a toward both circumferential end portions, and is constant over the radial direction of the half thrust bearing at any circumferential positions of the half thrust bearing. Therefore, even when the change of the inclination of the thrust collar surface 12 relative to the rear surface 84a of the half thrust bearing 8 is generated as shown in FIGS. 10A to 10E, the contact position between the sliding surface 81 and the thrust collar surface 12 successively moves in the circumferential direction from the circumferential end portion (FIGS. 10A and 11A) of the half thrust bearing 8 on the rotation direction backward side of the crankshaft to the circumferential end portion (FIGS. 10E and 11E) on the rotation direction forward side of the crankshaft as shown in FIGS. 11A to 11E in accordance with the rotation of the crankshaft. Accordingly, in the half thrust bearing 8 of the embodiment, such a phenomenon that only the sliding surface 81 near both circumferential end portions comes into direct contact with the thrust collar surface 12 of the crankshaft all the time is prevented, and thus damage (seizure) is also prevented.

Further, in the half thrust bearing 8 of the embodiment, the axial distance T is constant over the radial direction of the half thrust bearing 8 as described above. Accordingly, even when the thrust collar surface 12 is inclined due to the deflection of the crankshaft generated during operation of the internal combustion engine, a region on an outer diameter side of the sliding surface 81 of the half thrust bearing 8 is prevented from strongly coming into contact with the thrust collar surface 12 at any circumferential positions of the half thrust bearing 8.

Figure 12A:
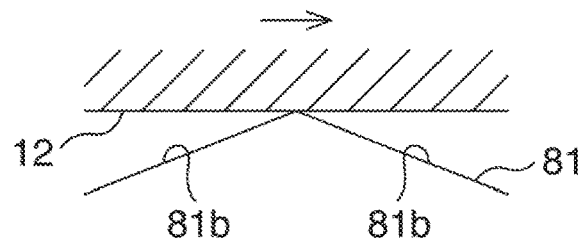
FIG. 12A is a cross-sectional view illustrating a contact state between the thrust collar surface and the sliding surface near a circumferentially central portion.
Figure 12B:
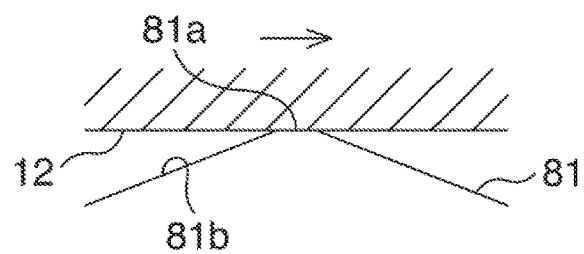
FIG. 12B is a cross-sectional view illustrating a contact state between the thrust collar surface and the sliding surface near a circumferentially central portion.
Figure 12C:
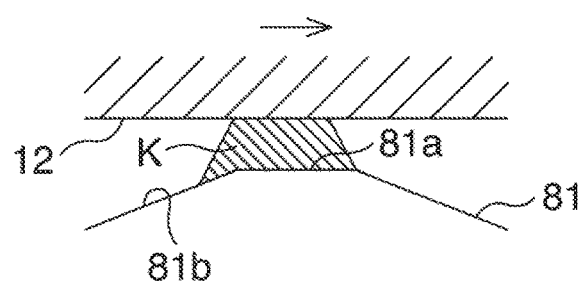
FIG. 12C is a cross-sectional view illustrating a contact state between the thrust collar surface and the sliding surface near a circumferentially central portion.
Figure 12D:
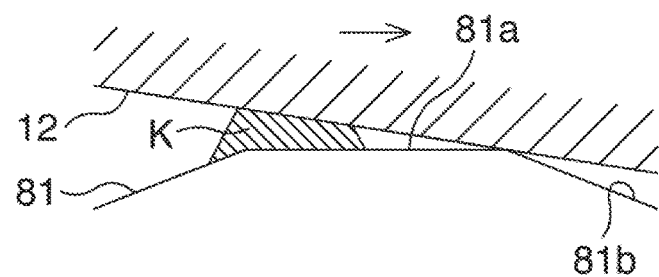
FIG. 12D is a cross-sectional view illustrating a contact state between the thrust collar surface and the sliding surface near a circumferentially central portion.

FIGS. 12A to 12D are cross-sectional views each illustrating a formation state of a wedge oil film K at the moment when the thrust collar surface 12 comes into contact with the sliding surface 81 near the circumferentially central portion which may have various shapes, and an arrow in each drawing illustrates the rotation direction of the crankshaft and thus the flowing direction of a fluid (lubrication oil). When the fluid is led into a portion between the two surfaces which are made narrow appropriately toward the front of the flowing direction of the fluid, a pressure is generated so that the wedge oil film K is formed. However, when the distance between the two surfaces becomes large toward the front, a mechanism which makes the oil film disappear is provided. In other words, the formation state of the oil film changes depending on the arrangement of the thrust collar surface 21 and the sliding surface 81. In the cases that the sliding surface 81 does not have a flat surface portion but is configured only by the inclined surface portions 81b as shown in FIG. 12A, and that the circumferential length of the flat surface portion 81a of the sliding surface 81 is less than a suitable range as shown in FIG. 12B, no effective wedge oil film is formed on the sliding surface 81 near the circumferentially central portion, so that the thrust collar surface 12 strongly comes into contact with the sliding surface 81 near the circumferentially central portion and the friction loss becomes large. On the contrary, when the flat surface portion 81a has a circumferential length within a suitable range as shown in FIG. 12C, the wedge oil film K is formed from the inclined surface portion 81b on the rotation direction backward side of the crankshaft over the entire flat surface portion 81a, which prevents the thrust collar surface 12 from strongly coming into contact with the sliding surface 81 near the circumferentially central portion and thus prevents large friction loss. However, when the circumferential length of the flat surface portion 81a exceeds a suitable range as shown in FIG. 12D, the wedge oil film K disappears on the rotation direction forward side of the flat surface portion 81a, so that the thrust collar surface 12 strongly comes into contact with the sliding surface 81 near the circumferentially central portion and the friction loss becomes large. Accordingly, in order to prevent the thrust collar surface 12 from strongly coming into contact with the sliding surface 81 and prevent the friction loss from becoming large, the circumferential length of the flat surface portion 81a needs to be within a suitable circumferential angle θ, and the circumferential angle θ is preferably 5° to 35°.

Embodiment 2

Figure 13:
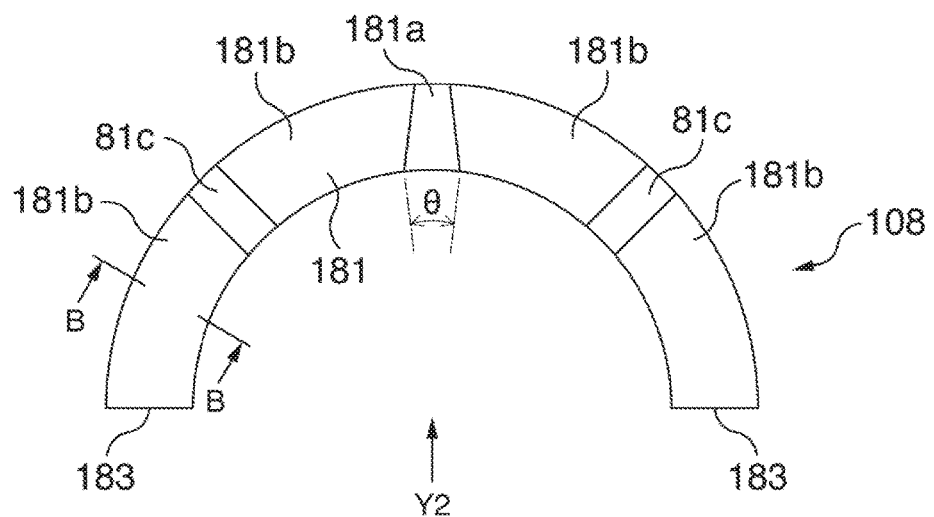
FIG. 13 is a front view of a half thrust bearing of embodiment 2.

Hereinafter, a description will be given, using FIGS. 13 to 15, for a half thrust bearing 108 including a sliding surface 181 having a form different from that of embodiment 1. It is to be noted that the parts identical or equal to those in embodiment 1 will be described with the same reference characters.

(Configuration)

The general configuration of the bearing device 1 of this embodiment is similar to that of embodiment 1. The configuration of the half thrust bearing 108 is also generally similar to that of embodiment 1 except for the shape of the sliding surface 181.

The half thrust bearing 108 of embodiment 2 also includes the reference plane 84 perpendicular to the axial direction like the half thrust bearing 8 of embodiment 1, and includes the rear surface 84*a* which is adapted to be provided on the seat 6 of the cylinder block 2 and is a substantially flat shape, in this reference plane 84. In addition, the half thrust bearing 108 includes the sliding surface 181 apart from the reference plane 84 (the rear surface 84*a*) in the axial direction. The sliding surface 181 includes one flat surface portion 181*a* which is formed near the circumferentially central portion and is in parallel with the reference plane 84, and two inclined surface portions 181*b* which are positioned on both circumferential sides of the flat surface portion 181*a*. An axial distance from the reference plane 84 (the rear surface 84*a*) to the sliding surface 181 corresponds to a bearing wall thickness of the half thrust bearing 108. This bearing wall thickness (axial distance from the reference plane 84 to the sliding surface 181) is formed so as to be maximum in the flat surface portion 181*a* near a circumferentially central portion of the half thrust bearing 108 and be reduced in the inclined surface portions 181*b* from the sides of the flat surface portion 181*a* toward both circumferential end portions of the half thrust bearing, at any radial positions. Accordingly, as shown in FIG. 14, seen from a direction perpendicular to a plane containing both circumferential end surfaces 183 of the half thrust bearing 108, the sliding surface 181 of the half thrust bearing 108 has an outline of a convex shape in which the flat surface portion 181*a* is protruded most.

Figure 14:
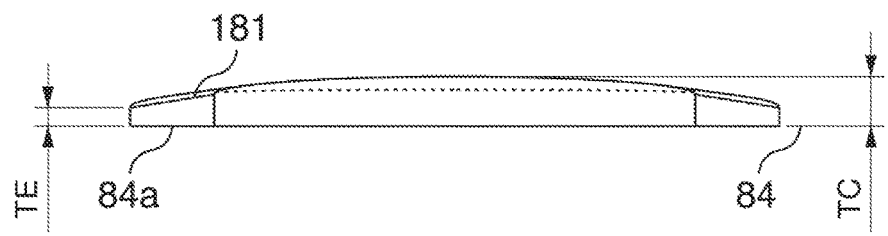
FIG. 14 is a side view of the half thrust bearing in FIG. 13 seen in the direction of arrow Y2.
Figure 15:
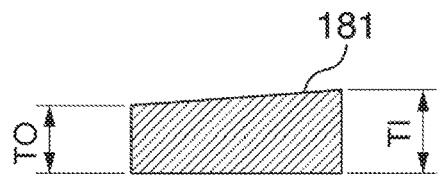
FIG. 15 is a cross-sectional view of the half thrust bearing in FIG. 13 taken along line B-B.

Particularly in this embodiment, the bearing wall thickness is formed so that a bearing wall thickness TI at an inner end in the radial direction is maximum and a bearing wall thickness TO at an outer end in the radial direction is minimum at any circumferential positions, except for the flat surface 181*a*, namely, in the inclined surface portions 181*b* (see FIG. 15). Accordingly, in the embodiment, the bearing wall thickness of the half thrust bearing 108 is maximum (TC) in the flat surface portion 181*a* near the circumferentially central portion, and is minimum (TE) at radially outer end of both circumferential end portions (see FIG. 14). Further, as shown in FIG. 13, the flat surface portion 181*a* has a front shape which is surrounded by an inner peripheral portion defined by a circular arc at a radially inner end of the half thrust bearing 108, an outer peripheral portion defined by a circular arc at a radially outer end thereof, and two straight lines positioned on opposite circumferential sides thereof. A circumferential length of the flat surface 181*a* is minimum at the outer peripheral portion of the half thrust bearing 108, and gradually becomes large toward the inner peripheral portion. A circumferential length θ of each of the inner peripheral portion and the outer peripheral portion of the flat surface portion 181*a* is preferably formed to extend over a circumferential angle θ of 5° to 35°.

The half thrust bearing 108 of the embodiment provides, similar to the half thrust bearing 8 of embodiment 1, an effect of preventing the sliding surface 181 near both circumferential end portions from always being in contact with the thrust collar surface 12, and an effect of preventing the sliding surface 181 near the circumferentially central portion from strongly coming into contact with the thrust collar surface 12. In addition, the half thrust bearing 108 of the embodiment also provides an effect that the sliding surface 181 near the radially outer end is less likely to come into direct contact with the thrust collar surface 12.

It is to be noted that in the half thrust bearing 108 of embodiment 2, the sliding surface 181 is formed so as to have a straight linear outline in the radial cross-section shown in FIG. 14, however, may be formed so as to have a curved surface including a curved outline.

Embodiments 1 and 2 of the present invention have been described in detail above with reference to the drawings, however, it should be understood that the specific configurations are not limited to these embodiments, and the present invention can include design modifications which do not depart from the gist of the present invention.

For example, in embodiments 1 and 2, the bearing device 1 of a type in which the half bearing and the half thrust bearing are separated has been described, however, the present invention is not limited to this type, and is applicable to the bearing device 1 of a type in which the half bearing and the half thrust bearing are integrated.

Figure 16:
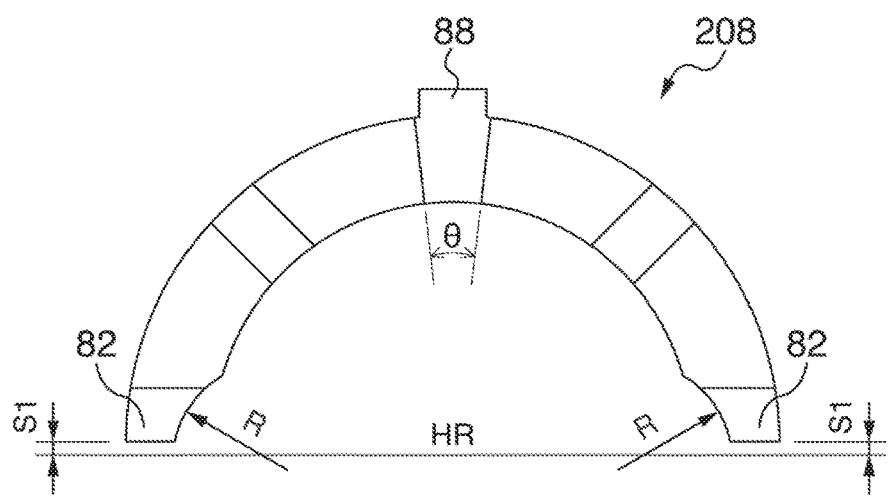
FIG. 16 is a front view of a half thrust bearing of another embodiment of the present invention.
Figure 17:
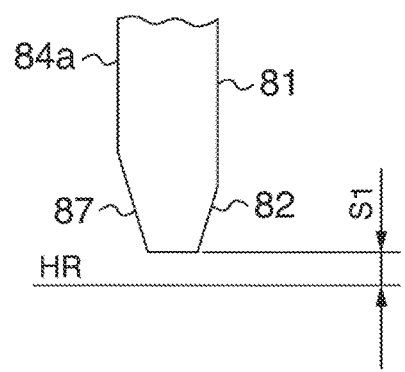
FIG. 17 is a side view of the half thrust bearing in FIG. 16 near a circumferential end portion.

Further, as shown in FIG. 16, the present invention is applicable to a half thrust bearing 208 with a protrusion 88 protruding outwardly in a radial direction for positioning and rotation prevention. It is to be noted that the protrusion 88 does not need to satisfy the configuration of the axial distance T described above. Further, as shown in FIGS. 16 and 17, thrust reliefs 82 are provided on the sliding surface 81 near both circumferential end portions of the half thrust bearing. In addition, as shown in FIG. 17, rear surface reliefs 87 may be also formed by providing tapers on both circumferential end portions of the rear surface 84*a* on the opposite side to the sliding surface 81 of the half thrust bearing 208. It is to be noted that when the thrust reliefs 82 or the rear surface reliefs 87 are provided, the bearing wall thickness TE at the radially outer end at both circumferential end portions of the half thrust bearing described above is defined as an axial distance between an imaginary sliding surface 81 (plane in which the sliding surface 81 is extended to the circumferential end portion) and an imaginary rear surface 84*a* (plane in which the rear surface 84*a* is extended to the circumferential end portion) that are obtained when the thrust reliefs 82 and the rear surface reliefs 87 are not provided.

Further, as shown in FIGS. 16 and 17, the half thrust bearing 208 is formed such that a circumferential length of the half thrust bearing 208 is shorter by a predetermined length S1 from a position HR of the circumferential end surfaces of the normal half thrust bearing 8 illustrated in embodiment 1. In addition, the half thrust bearing 208 is formed such that an inner peripheral surface near each of both circumferential end portions may be cut out in a circular arc shape with a radius R. In that case, the bearing wall thickness T at the circumferential end portions of the half thrust bearing can be expressed by a bearing wall thickness at the circumferential end portions of the half thrust bearing existing when the circumferential length of the half thrust bearing 208 is not made to be shorter by the length S1 and the cutout is not formed.

Further, the half thrust bearing may also have chamfers along the circumferential direction at a radial direction outer edge and/or a radial direction inner edge on the sliding surface of the half thrust bearing. In that case, the bearing wall thickness TI at the radially inner end and the bearing wall thickness TO at the radially outer end of the half thrust bearing can be expressed by the bearing wall thicknesses at the radially inner end and the radially outer end of the half thrust bearing that exist if the chamfers are not formed.

Both of above embodiments relate to half thrust bearings in which each of the inclined surface portions 81*b* or 181*b* includes one oil groove 81*c*, however, the present invention is not limited to those, and either one of the inclined surface portions 81b or 181b may have an oil groove, or each of the inclined surface portions 81b or 181b may have two or more oil grooves.

Further, above embodiments have been described for the case where one bearing device uses four half thrust bearings, however, the present invention is not limited to this. The desired effect can also be obtained by using at least one half thrust bearing of the present invention. Alternatively, in the bearing device, the half thrust bearings of the present invention may be integrally formed with the half bearings on one or both axial end surfaces thereof that rotatably support the crankshaft.

The invention claimed is:

1. A half thrust bearing for receiving an axial force of a crankshaft of an internal combustion engine, the half thrust bearing having a semi-annular shape and comprising a sliding surface for receiving the axial force, and a rear surface on an opposite side of the sliding surface, and the half thrust bearing defining a reference plane on a rear surface side that is perpendicular to an axial direction, wherein the sliding surface includes a flat surface portion extending in parallel with the reference plane from a radially inner end of the half thrust bearing to a radially outer end thereof, and inclined surface portions formed on both sides in a circumferential direction of the flat surface portion, an axial distance between the reference plane and the sliding surface is maximum in the flat surface portion, at any radial positions, the axial distance in the inclined surface portions is maximum at circumferential ends of the inclined surface portions on a circumferentially central portion side of the half thrust bearing and is reduced toward both circumferential end portions of the half thrust bearing, at any circumferential positions, the axial distance in the inclined surface portions is constant over a radial direction of the half thrust bearing, or maximum at the radially inner end of the half thrust bearing and is reduced toward the radially outer end, and the flat surface portion has a circumferential length extending over a circumferential angle of 5° or more and 35° or less, at any radial positions of the half thrust bearing.

2. The half thrust bearing according to claim 1, wherein the rear surface is flat, and is positioned within the reference plane.

3. The half thrust bearing according to claim 1, wherein the flat surface portion includes a circumferentially central portion of the half thrust bearing.

4. The half thrust bearing according to claim 1, wherein the circumferential length of the flat surface portion is minimum at the radially inner end of the half thrust bearing and is gradually increased toward the radially outer end thereof, or is minimum at the radially outer end of the half thrust bearing and is gradually increased toward the radially inner end thereof.

5. The half thrust bearing according to claim 1, wherein when the half thrust bearing is seen from a direction perpendicular to both circumferential end surfaces of the half thrust bearing, an outline of each inclined surface portion of the sliding surface is configured by a curved line.

6. The half thrust bearing according to claim 1, wherein a difference between the axial distance in the flat surface portion and the axial distance in both circumferential end portions at the radially outer ends of the half thrust bearing is 50 to 800 μm.

* * * * *